United States Patent
Wong et al.

(10) Patent No.: US 6,554,388 B1
(45) Date of Patent: Apr. 29, 2003

(54) METHOD FOR IMPROVING PRINTER UNIFORMITY

(75) Inventors: Victor C. Wong, Rochester, NY (US); Badhri Narayan, Rochester, NY (US); William M. Barnick, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/977,545

(22) Filed: Oct. 15, 2001

(51) Int. Cl.[7] .......................... B41J 29/393; B41J 29/38
(52) U.S. Cl. ........................................ 347/19; 347/14
(58) Field of Search ............................. 347/19, 14, 12, 347/10, 11, 6, 23, 15, 16, 8, 17; 355/208

(56) References Cited

U.S. PATENT DOCUMENTS

| 4,827,279 A | 5/1989 | Lubinsky et al. |
| 5,546,165 A | 8/1996 | Rushing et al. |
| 5,684,568 A | 11/1997 | Ishikawa et al. |
| 5,790,240 A | 8/1998 | Ishikawa et al. |
| 5,798,773 A | * 8/1998 | Hiramatsu et al. ............ 347/19 |
| 5,946,006 A | 8/1999 | Tajika et al. |
| 5,997,123 A | 12/1999 | Takekoshi et al. |
| 6,034,710 A | 3/2000 | Kawabe et al. |

* cited by examiner

Primary Examiner—Lamson Nguyen
Assistant Examiner—Charles W. Stewart, Jr.
(74) Attorney, Agent, or Firm—Nelson Adrian Blish

(57) ABSTRACT

An improvement for non-uniformity correction in a printing apparatus (10) wherein an image forming assembly (22) forms an image using a plurality of exposure elements, and the amount of exposure energy at each individual exposure element is capable of being varied. A test print (50) is generated, having a series of test patches or zones with predetermined density levels. A scanner (40) scans the test print (50) to obtain density value readings within each test density zone (52) for each pixel that corresponds to each exposure element. Density value readings are averaged. Then, difference in measurement from this average is used to compute a correction factor for each individual exposure element. An image data manager (12) conditions the input data by this correction factor, then sends the conditioned image data to the image forming assembly (22) for printing.

27 Claims, 5 Drawing Sheets

METHOD FOR IMPROVING PRINTER UNIFORMITY

FIELD OF THE INVENTION

This invention generally relates to an improvement to a printing apparatus that forms an image using a plurality of exposure elements and more particularly relates to a method for improving uniformity of output prints from such a printing apparatus.

BACKGROUND OF THE INVENTION

The difficulty of achieving uniform density output from a printer is a well-known problem in the printer art. Non-uniformity is particularly noticeable with high-quality color printers, where it is important to be able to faithfully reproduce subtle changes in shading and gradation or flat fields having the same density. Non-uniform response of a printhead causes unacceptable anomalies such as streaking and banding, which can easily render a print useless, or at least disappointing, for its intended audience.

Factors that contribute to printer non-uniformity vary, depending on the specific printing technology. With a thermal printhead, for example, where resistive print elements are linearly aligned along a writing surface, slight mechanical irregularities or additive mechanical tolerance variability can cause some elements to be more effective in transferring heat than others. With a printhead that scans optically, such as a CRT printhead, optical aberrations or fringe effects can mean that light power is less effectively distributed at the extreme edges of the scan pattern than it is in the center of a scan line. In a photofinishing system that uses an array of light-emitting elements, such as a Micro Light Valve Array (MLVA) in the Noritsu model QSS-2711 Digital Lab System, manufactured by Noritsu Koki Co., located in Wakayama, Japan, individual elements in the array may vary in the intensity of light emitted.

Achieving printer uniformity for high-performance printers used, for example, as photofinishing systems, graphic arts image-setters, and color proofing systems, can be particularly complex. Due to customer expectations for quality, the problem of printing apparatus non-uniformity is especially acute in the photofinishing arts. In photofinishing, the continued development of digital solutions for image scanning and printing of photographic-quality images make the problem of achieving print uniformity particularly important. To complicate the task of achieving uniformity among printers used in photofinishing, these printing apparatus may include components provided by more than one manufacturer. Companies specializing in different aspects of the photofinishing process provide exposure apparatus, development apparatus, scanning devices, film and paper, and consumable development chemicals needed in the process. In order to design a complete photofinishing printing apparatus, a systems integrator may create a system by combining preferred components and consumables from a number of vendors. In many cases, vendor companies providing the various components and consumables may even be, at least in part, competing against one another. From the perspective of a supplier of one or more components, it is advantageous to be able to provide a printing apparatus subsystem that can maintain or improve image quality with minimal dependency on other subsystems. From the alternate perspective of an integrator of components, it is advantageous to be able to purchase a necessary component or consumable from a photofinishing manufacturer as a "black box", where no proprietary information on internal components or operation is needed or provided. Instead, in order to integrate a component or consumable into a photofinishing printing apparatus, a systems integrator only needs access to information on performance and external operation for those components.

As one relatively complex type of printer, a conventional printing apparatus used for digital photofinishing typically comprises the key subsystems shown in FIG. 1. Here, a printing apparatus is generally numbered 10. The data path for printing apparatus 10 is represented by solid arrowed line B. A digital image source 12 provides input image data. Digital image source 12 could be, for example, a color scanner. An image data manager 14 performs digital manipulation and processing of the input image data from digital image source 12. Image data manager 14 is a computer, which may be a Windows or UNIX platform, for example, specially configured for its imaging function. Image data manager 14 comprises the necessary CPU, disk storage, and memory components for processing an image and providing the image data at its output.

As the printing engine of printing apparatus 10, an image forming assembly 22 comprises a printhead 16 and support circuitry, including a transfer element 36, an optional transport mechanism 28 (where printhead 16 includes moving parts or scanning components), and a drive electronics assembly 26 that controls the amount of energy applied to transfer element 36. A system controller 30 provides control logic and processing functions for image forming assembly 22 components. Printhead 16 creates an image by applying energy from transfer element 36 onto a receiver substrate 18. For typical apparatus of this type, receiver substrate 18 is photosensitive print paper. For such a typical system, transfer element 36 applies light energy to expose the paper. Alternate combinations of receiver substrate 18 and transfer element 36 are possible, however, such as using a colorant that is applied directly to receiver substrate 18 (for example, ink) or a colorant donor material. For inkjet printing, transfer element 36 provides colorant directly, where the amount of colorant transfer is modulated by varying the amount of heat exposure energy applied to inkjet nozzles. For printing apparatus 10 using colorant donor imaging technology, transfer element 36 can apply light or heat exposure energy to a donor material (not shown) to transfer colorant to receiver substrate 18. For any type of printing apparatus 10, dashed line A represents the travel path of receiver substrate 18 from a receiver supply 24 through image forming assembly 22. A processor 20 provides any necessary processing of receiver substrate 18 in order to provide a completed output print 38. For photofinishing printing apparatus 10 that uses photosensitive silver-halide chemistry, processor 20 uses a series of chemicals (for example, bleach, fixer, and developer) that develop the latent image exposed by printhead 16 onto receiver substrate 18. For printing apparatus 10 using a donor colorant, processor 16 may transfer colorant from a receiver substrate 18 onto paper stock, with optional addition of a lamination layer.

Referring again to FIG. 1, it is instructive to note that conventional approaches for non-uniformity correction are directed to internal adjustments that are made to components within image forming assembly 22. For some types of printing apparatus 10, a sensor 58 is provided in order to measure a characteristic of transfer element 36. Sensor 58 feedback then goes to image forming assembly 22 to adjust the behavior of drive electronics assembly 26. Dotted line C represents this feedback path using sensor 58. For other types of printing apparatus 10, a scanning device 60, such as a scanner or densitometer, is employed to obtain measurements from output print 38. Data from scanning device 60 is then directed to image forming assembly 22 to adjust the behavior of drive electronics assembly 26. Dotted line D represents this alternate feedback path using scanning device 60 measurements. It is instructive to note that, when using the feedback path indicated by dotted line D, density data is obtained from output print 38. Image forming assembly 22 must perform some further conversion of this feedback density data to data values actually used by printhead 16 to control exposure.

The disclosures of the following patents illustrate conventional approaches for non-uniformity correction as applied for various types of printheads 16:

U.S. Pat. No. 5,546,165 (Rushing et al.) discloses non-uniformity correction applied in an electrostatic copier, using LED technology in transfer element 36. Feedback measurements from a scanned, flat field contone test print are obtained in order to calculate adjustments to individual LED drive currents or on-times. Referring to FIG. 1, the approach disclosed in the Rushing et al. patent modifies the behavior of drive electronics assembly 26. To obtain and adjust non-uniformity data, this approach uses the basic scanning device 60-based feedback path denoted D in FIG. 1.

U.S. Pat. No. 5,684,568 (Ishikawa et al.) discloses non-uniformity correction applied in a printer used for developing photosensitive media. Light intensity from an exposure source employing an array of lead lanthanum zirconate titanate (PLZT) light valves serves as transfer element 36. This output light is measured to identify individual light valve elements that require adjustment for non-uniformity. Referring to FIG. 1, the approach disclosed in the Ishikawa et al. patent modifies the behavior of drive electronics assembly 26 for individual light valve elements, either controlling exposure time or light power level. To obtain and adjust non-uniformity data, this approach uses the basic sensor 58-based feedback path denoted C in FIG. 1.

U.S. Pat. No. 5,997,123 (Takekoshi et al.) discloses non-uniformity correction applied in an inkjet printer, where transfer element 36 comprises an array of nozzles. Control electronics are adjusted to modify dot diameter by controlling the applied nozzle energy or by modulating the number of dots produced. Again referring to FIG. 1, the approach disclosed in the Takekoshi et al. patent modifies the behavior of drive electronics assembly 26 for individual inkjet nozzles in the printhead 16 array. To obtain and adjust non-uniformity data, this approach uses the basic scanning device 60-based feedback path denoted D in FIG. 1.

U.S. Pat. No. 6,034,710 (Kawabe et al.) discloses non-uniformity correction applied in a photofinishing printing apparatus that employs Vacuum Fluorescent Print Head (VFPH) technology for printheads 16. Again referring to FIG. 1, the approach disclosed in the Kawabe et al. patent modifies the behavior of drive electronics assembly 26 by adjusting the exposure time of individual elements in the VFPH array. To obtain and adjust non-uniformity data, this approach uses the basic sensor 58-based feedback path denoted C in FIG. 1.

U.S. Pat. No. 5,946,006 (Tajika et al.) discloses non-uniformity correction applied in an inkjet printer, where transfer element 36 comprises an array of nozzles. Referring to FIG. 1, correction data goes directly to printhead 16. To obtain and adjust non-uniformity data, this approach uses the basic scanning device 60-based feedback path denoted D in FIG. 1.

U.S. Pat. No. 5,790,240 (Ishikawa et al.) discloses non-uniformity correction applied in a printer using PLZT (or LED or LCD) printing elements as transfer element 36. Referring to FIG. 1, a correction voltage is applied directly to drive electronics assembly 26 in order to adjust the output amplitude of an individual PLZT array element. Alternately, duration of the drive signal to an individual PLZT array element is adjusted at drive electronics assembly 26. To obtain and adjust non-uniformity data, this approach uses the basic scanning device 60-based feedback path denoted D in FIG. 1.

U.S. Pat. No. 4,827,279 (Lubinsky et al.) discloses non-uniformity correction applied in a printer where printhead 16 uses an array of resistive thermal elements. Density measurements are obtained for each individual thermal element and are used to determine correction factors. Referring to FIG. 1, number of applied pulses or pulse duration at drive electronics assembly 26 are used in order to achieve uniformity. To obtain and adjust non-uniformity data, this approach uses the basic scanning device 60-based feedback path denoted D in FIG. 1.

With each of the conventional solutions noted above, non-uniformity correction is applied by making adjustments to drive electronics 26 in image forming assembly 22. This method for non-uniformity correction, however, has disadvantages, making drive electronics design more complex, requiring correction table data to be accessible at an external interface, or requiring the printhead 16 design to accommodate additional control signals. Because correction data must be fed back to image forming assembly 22, implementation of these conventional solutions requires that an integrator have detailed knowledge of the internal workings of image forming assembly 22. As noted above, this can complicate and delay commercialization of a printing apparatus, since different manufacturers may be involved. Moreover, image forming assembly 22 may not have a non-uniformity correction scheme, or may have a scheme that must be modified and improved for a specific implementation. Or, a manufacturer of image forming assembly 22 may discontinue production of a specific model, or change the design of printhead 16 components. For these reasons, it can be difficult or impossible to obtain a desired printing apparatus uniformity improvement when using the conventional methods, as illustrated in the prior art patents cited above. Thus it can be seen that conventional approaches, as outlined and illustrated by examples above, present problems that can make it difficult or impossible to obtain uniformity on an output print from a printing apparatus. While there have been methods for compensating for non-uniformity from image forming assembly 22, there is a long-felt need for a printer improvement and method for achieving uniformity on an output print.

SUMMARY OF THE INVENTION

It is an object of the present invention to provide an improvement to a printing apparatus for non-uniformity correction and a method for non-uniformity correction.

According to an aspect of the present invention, the improvement resides in a printing apparatus that uses an image forming assembly comprising a plurality of exposure elements, where the amount of exposure energy is capable of being varied at each exposure element to provide a corresponding output colorant density, the improvement comprising:

(a) an output test print formed by the image forming assembly, the test print having a predetermined set of output colorant density levels;

(b) a scanner capable of scanning the output test print and providing, to correspond to each one of the plurality of exposure elements, a plurality of scanned density data values;

(c) an image data manager that accepts a plurality of image data values from an image data source and, within each one of the predetermined set of output colorant density levels, is capable of:

(1) computing, from the plurality of scanned density data values, an exposure element average density value corresponding to each one of the plurality of exposure elements, to generate a set of exposure element average density values for the plurality of exposure elements;

(2) computing, from the set of exposure element average density values for the plurality of exposure elements, a density level average density value corresponding to the predetermined set of output colorant density levels;

(3) computing, for each one of the plurality of exposure elements, a non-uniformity correction value based on the difference between the exposure element average density value and the density level average density value;

the image data manager further capable of conditioning, corresponding to each one of the plurality of exposure elements, each of the plurality of image data values from the image data source using the non-uniformity correction value to generate a conditioned image density data value and capable of providing the conditioned image density data value to the image forming assembly.

A feature of the present invention is the adaptation of the image data manager for non-uniformity compensation.

An advantage of the present invention is that it allows an image forming assembly in the printing apparatus to be considered as a modular unit, or "black box", so that detailed information about internal operation of the image forming assembly is not required for performing non-uniformity correction. No adjustments are made to internal components of the image forming assembly itself. Instead, the image data manager, based on scanner measurements from an output test print, directly modifies input image data provided to the image forming assembly. The present invention measures output density values to obtain a profile of printhead performance. The present invention uses these measured density values to adjust density values in the input image file, without requiring knowledge of how an image forming assembly obtains a desired density. Therefore, the present invention minimizes the need for thorough technical understanding of the particular image forming assembly being used.

A further advantage of the present invention is that it minimizes the need for a printing apparatus manufacturer to obtain detailed information about internal operation of an image forming assembly. A printing apparatus manufacturer, when assembling a printing apparatus, can employ an image forming assembly from another supplier, without requiring detailed internal information on the image forming assembly.

A further advantage of the present invention is that it allows a printing apparatus manufacturer to obtain non-uniformity correction even if a printing apparatus comprises an image forming assembly that does not already have non-uniformity correction.

A further advantage of the present invention is that it improves upon any built-in uniformity correction already applied by an image forming apparatus manufacturer. There is, moreover, no need to interfere with or modify any uniformity correction that is supplied with the image forming apparatus. An improvement to performance can be effected without changing any existing, builtin non-uniformity correction.

A further advantage of the present invention is that it provides a method for compensation for non-uniformity that can be used independently from printing apparatus calibration. Uniformity adjustments are separately performed from calibration adjustments.

A further advantage of the present invention is that it allows a printing apparatus manufacturer to adapt a printing apparatus to use a different image forming assembly, allowing the design of a printing apparatus that is not constrained to using a specific image forming assembly.

Yet a further advantage of the present invention is that it obtains non-uniformity correction without further complicating the design of drive electronics for the printhead.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
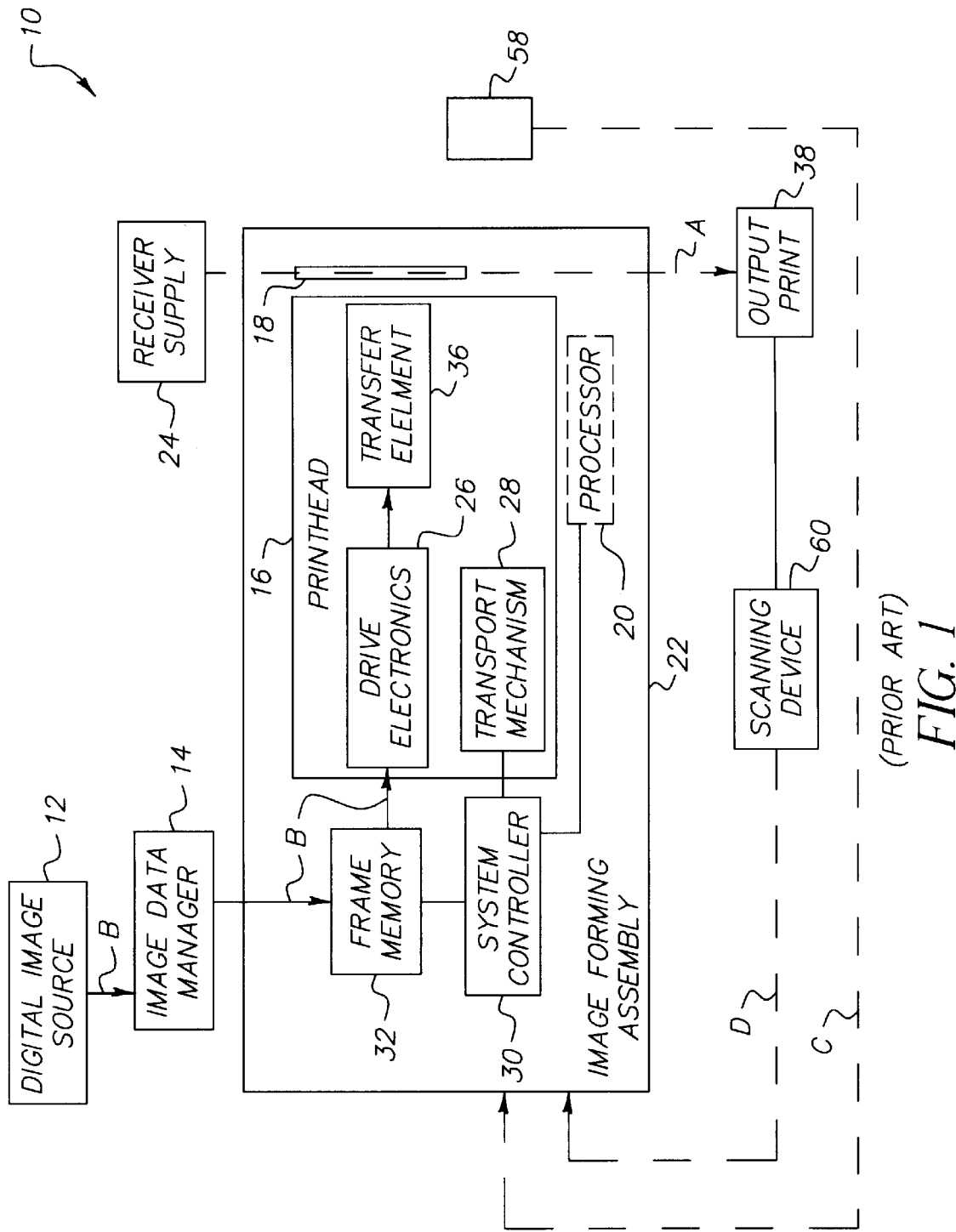
FIG. 1 is a block diagram showing a prior art printing apparatus.

While the present invention is directed generally to printing apparatus, specific emphasis in the following description is given to photofinishing printing apparatus. Referring again to FIG. 1, this invention relates to printing apparatus where printhead 16 uses a plurality of exposure elements. Each exposure element, in turn, images a discrete "pixel" on receiver substrate 18, with pixels substantially evenly spaced-apart on receiver substrate 18. Printhead 16 provides control of colorant density on output print 38, typically by controlling a voltage applied to drive electronics assembly 26 or by controlling the duration of an applied energizing pulse provided to drive electronics assembly 26. Transfer element 36 in image forming assembly 22 may create an image on receiver substrate 18 by means of any of the following:

Inkjet nozzles (in which exposure energy is generally provided by applying thermal energy within the inkjet nozzle assembly);

LED printing, employing one or more focused Light Emitting Diodes;

Laser array, such as using diode lasers;

Light-valve devices, such as lead lanthanum zirconate titanate (PLZT) light valves, typically in the form of an array with individual array elements separately controllable;

Resistive printhead, which applies heat to transfer colorant from a donor material.

Other related equipment to which the present invention may be applied also includes apparatus configured solely to develop film negatives or slides or apparatus configured to expose prints onto photosensitive paper.

The description that follows describes the present invention primarily as used with minilab apparatus; however, it is to be understood that the methods disclosed in this specification can be applied more broadly to include other types of printing apparatus, including photofinishing apparatus, developers, and other apparatus using the above-mentioned technologies for imaging.

Referring again to FIG. 1, the function of processor 20 depends on the imaging technology used. For example, for standard digital minilabs, processor 20 routes exposed receiver substrate 18 through a sequence of chemical baths in which the image is developed, fixed, and stabilized onto paper.

It is instructive to note that other types of printing apparatus, using any of the technologies noted above, perform, with variations, one or more similar operations as described for photofinishing minilabs. For example, a digital printer may not provide processor 20, but may perform only an exposure operation, whereby photosensitive paper, as receiver substrate 18, is exposed, to be subsequently developed on other equipment. For such equipment, processing takes place by feeding new, unexposed photosensitive paper from a feed roll as receiver supply 24, exposing the paper, then wrapping the exposed paper about a take-up roll, for development at a later time.

Figure 2:
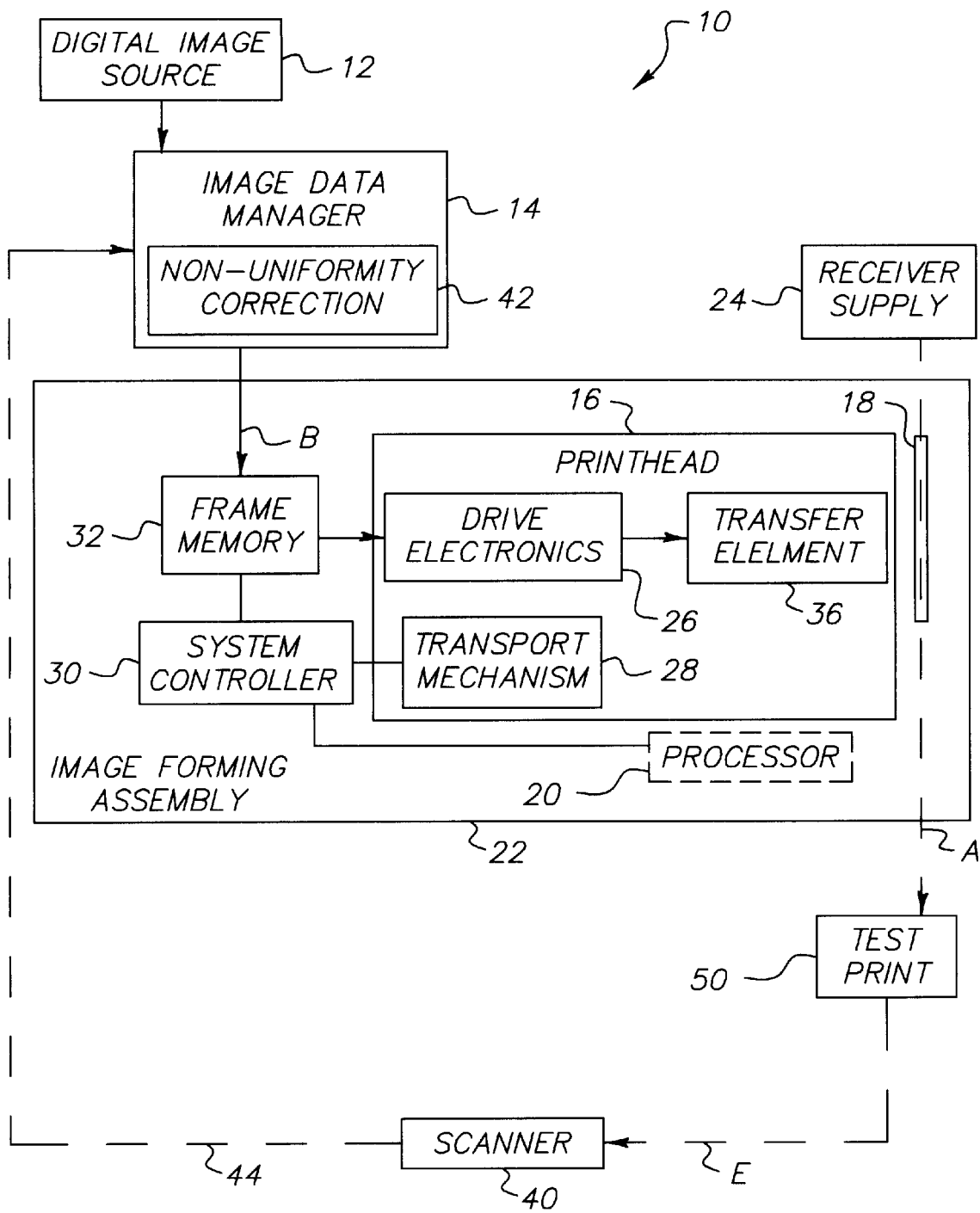
FIG. 2 is a block diagram showing a printing apparatus with the improvement of the present invention.

Referring to FIG. 2, there is shown a block diagram of an embodiment of the present invention, where printing apparatus 10 prints a uniformity test print 50. A scanner 40 is used to scan uniformity test print 50 and provides scanned density data to image data manager 14, over a scanner interface 44. Scanner interface 44 may be, for example, a SCSI interface connection, well known in the scanner interfacing arts. As indicated by dashed line E, the use of test print 50 and scanner 40 effectively creates a feedback loop to image data manager 14. Image data manager 14 processes received data from scanner 40 and generates a non-uniformity correction look-up table (NCLUT) 42, as is described subsequently.

Figure 3:
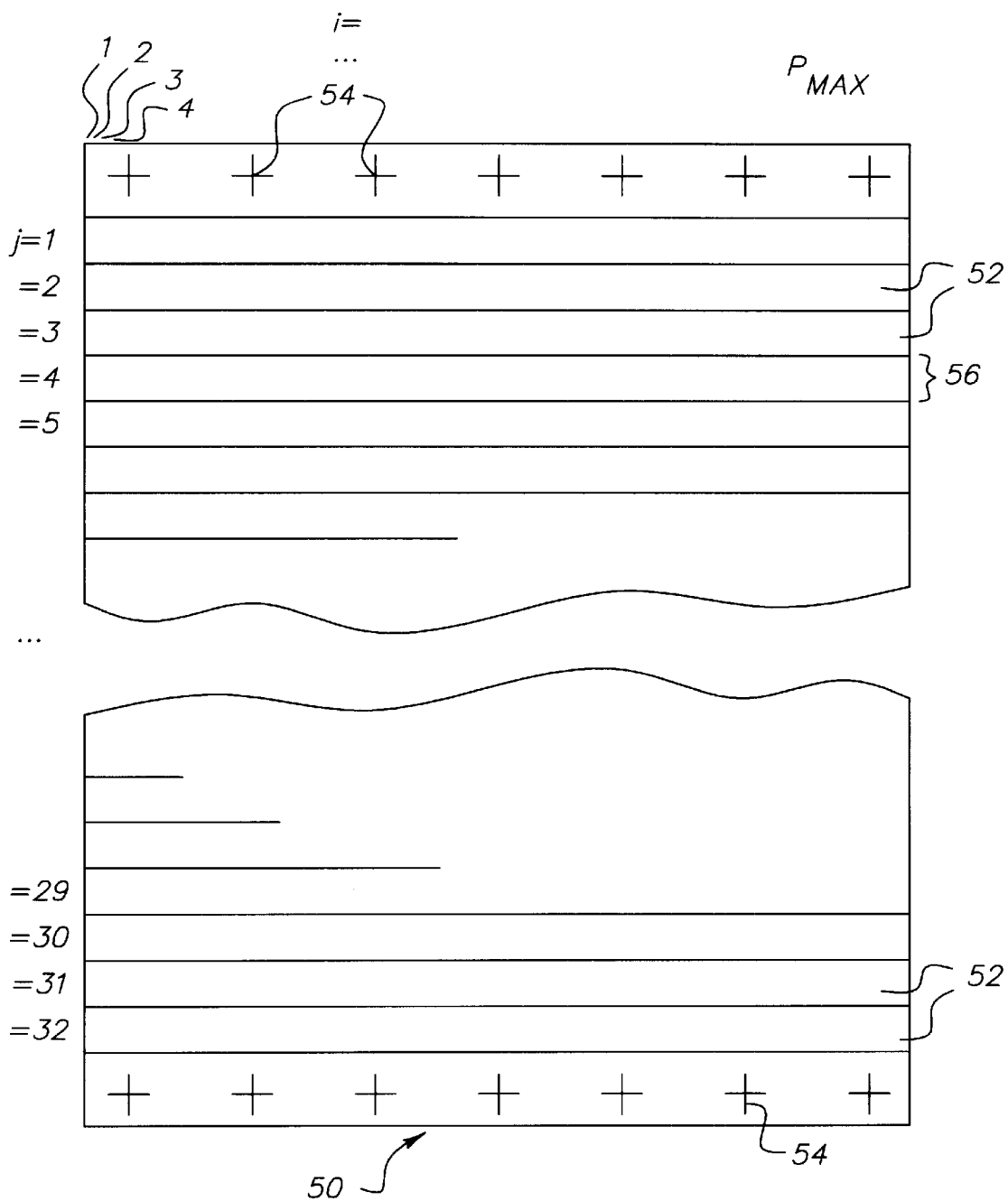
FIG. 3 is a plan view of an output print used to measure uniformity.

Referring to FIG. 3, there is shown a plan view of an exemplary uniformity test print 50 as used in a preferred embodiment. (Necessarily, FIG. 3 is representative only, and not to scale.) Test print 50 comprises a plurality of 32 density patches or density zones 52, printed in order of increasing optical density. Each density zone 52 is imaged by writing a number of lines of the same density. The height dimension of each density zone 52 is, therefore, dependent on the number of lines written. For a PLZT printhead 16, the width of each density zone 52 is advantageously equal to the writing width of printhead 16. For an inkjet or other type of printhead 16, the width of each density zone 52 can be otherwise suitably specified. Fiducial marks 54 are provided at evenly spaced increments to provide a reference for alignment of scanned points along the writing width of printhead 16.

In a preferred embodiment, density zones 52 are arranged in successive increments of optical density, from 0.04 to 2.52. By a convention used in the description that follows, density zones 52 are denoted by j=1,2,3, . . . 32. Pixel positions along each density zone 52 are then denoted by i=1,2,3, . . . $p_{max}$, where, in the preferred embodiment for a PLZT printhead 16, $p_{max}$ equals the number of pixels that are in transfer element 36 of printhead 16. For example, for a typical printhead 16 using PLZT technology for transfer element 36, $p_{max}$ is in excess of 5,000 pixels.

As FIG. 3 shows, the arrangement of test print 50 provides, for each pixel position i, multiple samples of densities j. As will be seen in subsequent description, the most useful measurements are taken from mid-band print lines 56. This arrangement, sampling readings taken in the middle of a density zone 52, minimizes stray effects that might be caused by transitions between density levels for density zones 52.

Using test print 50 as shown in FIG. 3, scanner 40 can obtain stable reference data by which to evaluate printhead 16 uniformity. Fiducial marks 54 enable correct alignment of scanned pixel data, to compensate for possible skewing of test print 50 on the scanner 40 platen or for possible mechanical tolerance error inherent to scanner 40.

Generation and Use of Non-Uniformity Correction Look-up Table (NCLUT) 42

As noted above, each individual pixel generated for a given target density by transfer element 36 writes to a corresponding coordinate on test print 50. The goal of non-uniformity correction is to adjust for the differences in each individual pixel at each of the target densities printed on test print 50.

Figure 4:
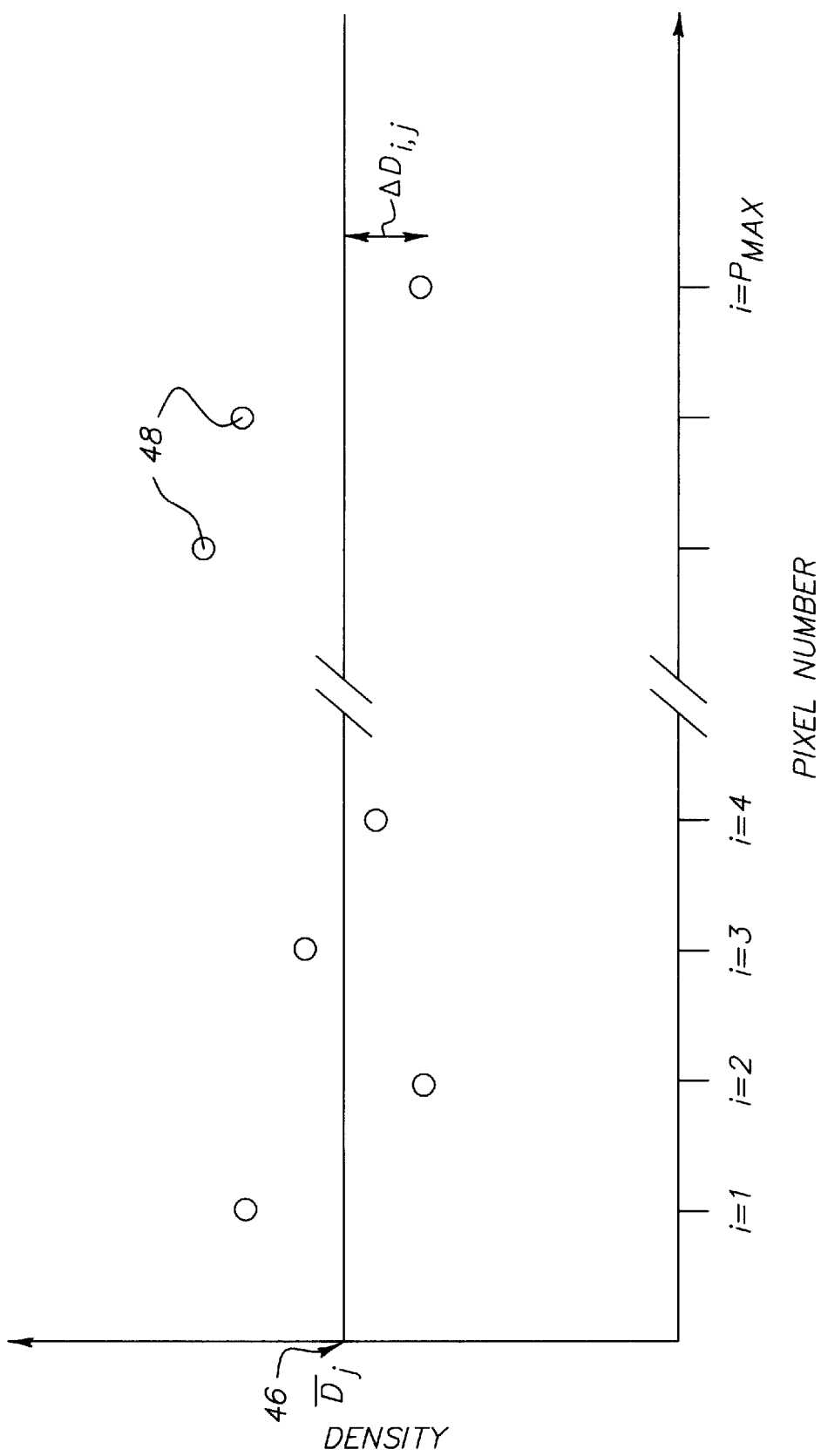
FIG. 4 is a graph illustrating how typical measured output densities for transfer elements in a printhead may vary from a target density; and, FIG. 5 is a block diagram showing the logic used to compute multiple output adjustment values to correct for non-uniformity.

Referring to FIG. 4, there is shown a small portion of an exemplary sampling of density readings 48. The horizontal dimension of the FIG. 4 graph represents individual pixels, i=1,2,3, . . . $p_{max}$. The vertical dimension represents the corresponding density reading 48 for a single density zone 52. An average density 46 (represented in mathematical form as $\overline{D}_j$, where subscript j indicates the specific density zone 52, from 1 to 32 as in the example of test print 50 in FIG. 3) for i=1,2,3, . . . $p_{max}$ is computed in the normal fashion. Thus, in this example, density readings 48 for pixels i=1 and i=3 are high when compared to average density 46, while density readings for pixels i=2 and i=4 are low.

Referring again to FIG. 4, for each density reading 48, a density non-uniformity correction value $\Delta D_{i,j}$ is computed. That is, a $\Delta D_{i,j}$ value is computed for each pixel position i for a given density zone j. Non-uniformity correction look-up table 42 stores each computed $\Delta D_{i,j}$ value.

Figure 5:
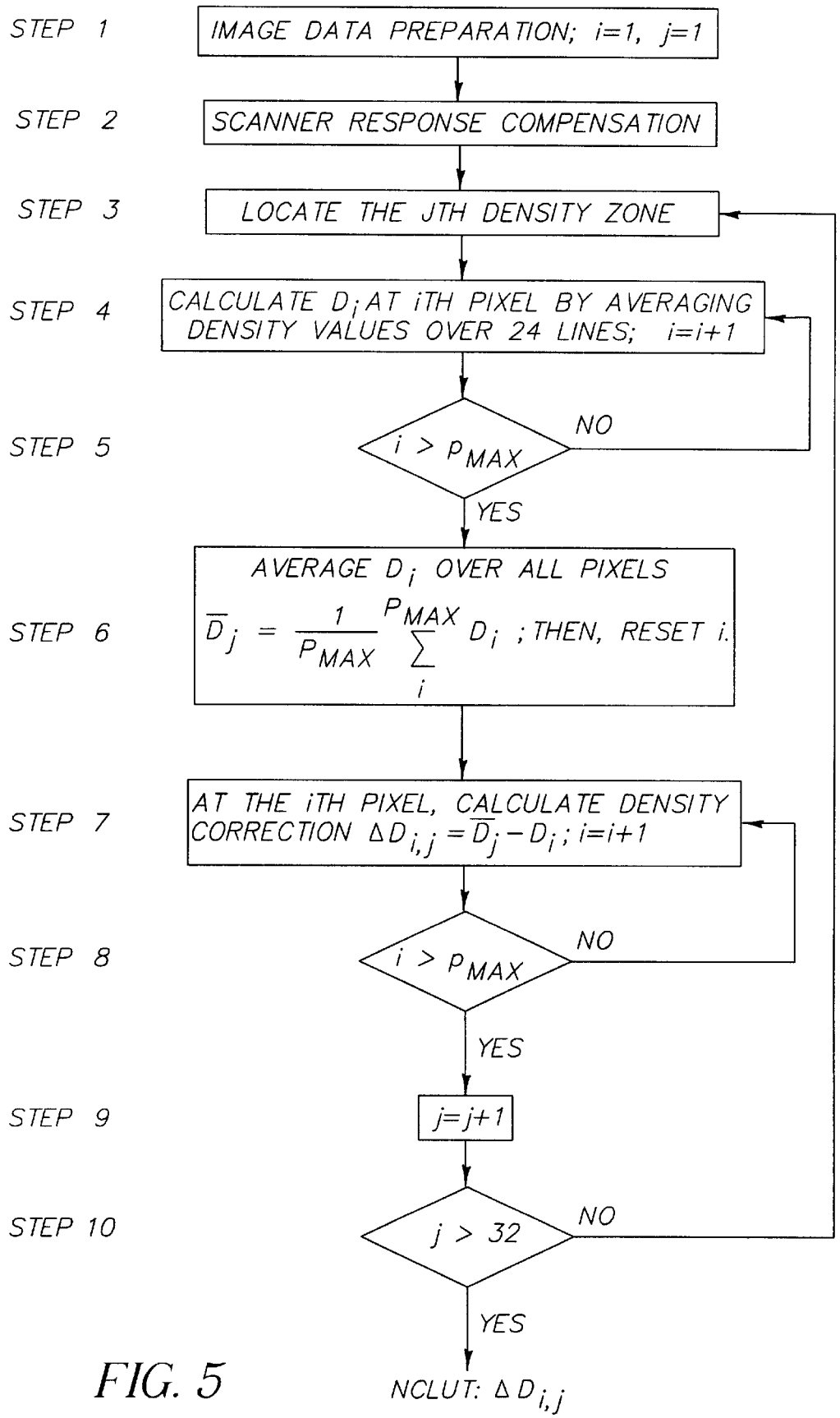

Referring to FIG. 5, there is shown an algorithm executed by image data manager 14 for populating non-uniformity correction table 42 with $\Delta D_{i,j}$ values. The steps shown in FIG. 5 are executed once for each color channel. In a preferred embodiment, Steps numbered Step-1 through Step-10 execute once for each R, G, and B color printed.

Step-1 prepares the image data scanned from test print 50, first resampling the scanned image data to the same resolution as provided by image forming assembly 22. This step rotates and shifts the entire scanned test image so that fiducial marks 54 are precisely located and aligned. Any image outside fiducial marks 54 in extreme corners is cropped. Then, any defective pixel datum, due to dust, for example, is replaced by a neighboring datum. Step-1 also initializes the density zone index, setting j=1 and the pixel index, setting i=1.

Step-2 compensates for measured scanner 40 response characteristics. As is well known in the imaging arts, any scanner has a characteristic, generally non-linear, response sensitivity within each color channel. Step-2 corrects for this characteristic, to effectively remove scanner response from interfering with actual scanned data readings.

Step-3 locates the jth density zone 52 on test print 50. Within jth density zone 52, an average density $D_i$ is then computed, for each pixel position i from i=1 to i=$p_{max}$, in Step-4 and decision Step-5. To obtain a stable average density $D_i$, readings are taken from multiple lines, among mid-band print lines 56 within the jth density zone 52. In a preferred embodiment, Step-4 uses 24 lines sampled near the middle of jth density zone 52 as mid-band print lines 56.

Step-6 then computes value $\overline{D_j}$ that gives average density reading 46 for density zone 52. As shown in FIG. 5, value $\overline{D_j}$ is determined in a standard way, by summing all $D_i$ values within the jth density zone 52 and dividing the total sum by the number of pixel positions, $p_{max}$. Step-6 then resets pixel index i=1.

As was illustrated in FIG. 4, each pixel i may differ in density from value $\overline{D_j}$. The amount by which $D_i$ differs from $\overline{D_j}$ is calculated in Step-7 to provide a density non-uniformity correction value $\Delta D_{i,j}$. Value $\Delta D_{i,j}$ is stored in non-uniformity correction look-up table 42. Step-7 and Step-8 then loop through to generate a total of pmax values of $\Delta D_{i,j}$ for the jth density zone 52. Step-9 and Step-10 then loop back through to Step-3 to repeat the procedure for each density zone 52. At completion of the algorithm of FIG. 5, two-dimensional non-uniformity correction look-up table 42 is created for each color channel.

Once non-uniformity correction look-up table 42 is created and stored by image data manager 14, image data from digital image source 12 can be modified for non-uniformity correction. The simplest method for non-uniformity correction is, for each color channel, simply to add the appropriate value $\Delta D_{i,j}$ to each corresponding data pixel, for a given target density. If the target density is not one of the 32 density zones 52, then a correction value will be interpolated between the closest density zones.

It can be seen that the method disclosed above provides non-uniformity correction without requiring direct control of individual components of image forming assembly 22. Instead, the image data provided to image forming assembly 22 is conditioned by image data manager 14 using values from correction look-up table 42. This arrangement enables the method of the present invention to be used with many types of image forming assembly 22. This method does not interfere with any built-in non-uniformity correction that is already provided for image forming assembly 22. Instead, this method is capable of improving upon such built-in non-uniformity correction. It is instructive to note a distinction between the method of the present invention and conventional methods for non-uniformity correction. In the method of the present invention, image data manager 14 operates on image data only in "density space." That is, only density values need to be measured and used in the computation of NCLUT 42. This is in contrast to conventional methods described above, in which density measurements are obtained from output print 38, then must be converted to obtain exposure data values usable by image forming assembly 22. By performing operations only with image density, the present invention avoids the necessity for a detailed understanding of the inner workings of image forming assembly 22.

While the invention has been described with particular reference to its preferred embodiments, it will be understood by those skilled in the art that various changes may be made and equivalents may be substituted for elements in the preferred embodiments without departing from the scope of the invention. For example, this method can be used for a single-color printer or for a printing apparatus that uses either additive color (red, green, blue) or subtractive color (cyan, magenta, yellow, and optionally black) with any number of channels. This method could be applied for an image forming assembly that uses inkjet, laser thermal, resistive thermal, LED (organic or inorganic), light-valve, or other technologies for image marking or exposure.

The preferred embodiment of the present invention scans test print 50 to obtain density data that can be used by image data manager 14. Alternately, feedback data from sensor 58 disposed to measure the output power of each exposure element of transfer element 36 could be used, as is illustrated for prior art printing apparatus 10 in FIG. 1. However, use of exposure feedback information would present some drawbacks. For many types of image forming assembly 22, it can be difficult to obtain exposure power measurements without significant disassembly effort, making such an alternative impractical. Moreover, the data obtained would be exposure data, while image data manager 14 works with density data. Thus, some type of conversion would be required in order to use sensor 58 data. This conversion could be further complicated by considerations of media response from receiver substrate 18 and from chemicals used in processor 20. As a result, while it might be feasible to use sensor 58 exposure data, the preferred embodiment, using test print 50 readings as described in detail above, appears to present significant advantages over the use of exposure measurements directly. Therefore, what is provided is an improvement to a printing apparatus and a method for improving printer uniformity.

The invention has been described in detail with particular reference to certain preferred embodiments thereof, but it will be understood that variations and modifications can be effected within the scope of the invention.

PARTS LIST

10. Printing apparatus
12. Digital image source
14. Image data manager
16. Printhead
18. Receiver substrate
20. Processor
22. Image forming assembly
24. Receiver supply
26. Drive electronics assembly
28. Transport mechanism
30. System controller
32. Frame memory
36. Transfer element
38. Output print
40. Scanner
42. Non-uniformity correction look-up table
44. Scanner interface
46. Average density reading
48. Density reading
50. Uniformity test print
52. Density zone
54. Fiducial marks
56. Mid-band print lines
58. Sensor
60. Scanning device

What is claimed is:

1. In a printing apparatus that uses an image forming assembly comprising a plurality of exposure elements, wherein an amount of exposure energy is capable of being varied at each one of said plurality of exposure elements in order to provide a corresponding output colorant density, the improvement comprising:

(a) an output test print formed by the image forming assembly, said test print having a predetermined set of output colorant density levels;

(b) a scanner capable of scanning said output test print and providing a plurality of scanned density data values corresponding to each one of said plurality of exposure elements;

(c) an image data manager that accepts a plurality of image data values from an image data source and, within each one of said predetermined set of output colorant density levels, is capable of:

(1) computing, from said plurality of scanned density data values, an exposure element average density value for each of said plurality of exposure elements, to generate a set of exposure element average density values for said plurality of exposure elements;

(2) computing, from said set of exposure element average density values for said plurality of exposure elements, a density level average density value;

(3) computing, for each one of said plurality of exposure elements, a non-uniformity correction value based on a difference between said exposure element average density value and said density level average density value;

said image data manager further capable of conditioning, corresponding to each one of said plurality of exposure elements, each of said plurality of image data values from said image data source using said non-uniformity correction value to generate a conditioned image density data value and capable of providing said conditioned image density data value to the image forming assembly.

2. The improvement of claim 1 wherein said output colorant density levels are comprised of red, green and blue.

3. The improvement of claim 1 wherein said output colorant density levels are comprised of cyan, magenta and yellow.

4. The improvement of claim 1 wherein said exposure energy is optical exposure energy.

5. The improvement of claim 1 wherein said exposure energy is thermal energy.

6. The improvement of claim 1 wherein said corresponding output colorant density is obtained using a pigment.

7. The improvement of claim 1 wherein said corresponding output colorant density is obtained using an ink.

8. The improvement of claim 1 wherein said corresponding output colorant density is obtained using a dye.

9. The improvement of claim 1 wherein said corresponding output colorant density is obtained using a toner.

10. The improvement of claim 1 wherein an interpolated non-uniformity correction value is obtained from non-uniformity correction values corresponding to two closest output colorant density levels when an output colorant density level is not in said predetermined set.

11. In a printing apparatus that uses an image forming assembly comprising a plurality of exposure elements, wherein an amount of exposure energy is capable of being varied at each one of said plurality of exposure elements in order to provide a corresponding output colorant density, a method for non-uniformity correction, the method comprising:

(a) generating an output test print formed by the image forming assembly, said test print having a predetermined set of output colorant density levels;

(b) scanning said output test print and providing a plurality of scanned density data values corresponding to each one of said plurality of exposure elements;

(c) providing an image data manager that accepts a plurality of image data values from an image data source and, within each one of said predetermined set of output colorant density levels, performs the steps of:

(1) computing, from said plurality of scanned density data values, an exposure element average density value for each of said plurality of exposure elements, to generate a set of exposure element average density values for said plurality of exposure elements;

(2) computing, from said set of exposure element average density values for said plurality of exposure elements, a density level average density value;

(3) computing, for each one of said plurality of exposure elements, a non-uniformity correction value based on the difference between said exposure element average density value and said density level average density value;

(d) conditioning, corresponding to each one of said plurality of exposure elements, each of said plurality of image data values from said image data source using said non-uniformity correction value to generate a conditioned image density data value; and (e) providing said conditioned image density data value to the image forming assembly.

12. The method of claim 11 wherein the step of generating an output test print further comprises the step of providing fiducial markings for determining pixel alignment.

13. The method of claim 11 wherein said exposure energy is optical exposure energy.

14. The method of claim 11 wherein said exposure energy is thermal energy.

15. The improvement of claim 11 wherein an interpolated non-uniformity correction value is obtained from non-uniformity correction values corresponding to two closest output colorant density levels when an output colorant density level is not in said predetermined set.

16. The improvement of claim 11 wherein said output colorant density levels are comprised of red, green and blue.

17. The improvement of claim 11 wherein said output colorant density levels are comprised of cyan, magenta and yellow.

18. A method for improving uniformity in a printed image comprising:

(a) printing a test image;

(b) scanning said test image;

(c) computing a first average density of a first column at a first density level for a first exposure element;

(d) repeating step (c) for each column for each exposure element for said first density level;

(e) averaging all of said average densities to obtain first average level density;

(f) subtracting said first average density from said first average level density to obtain a uniformity correction factor for said first exposure element for said first density level;

(g) repeating step (f) for each average density for each column at said first density level to obtain a non-uniformity correction value for each of said exposure elements; and (h) repeating steps (c)–(g) for a plurality of density levels to obtain a non-uniformity correction value for each of said exposure elements for each of said plurality of density levels.

19. The improvement of claim 18 wherein an interpolated non-uniformity correction value is obtained from non-uniformity correction values corresponding to two closest density levels when an output density level is not among said plurality of density levels.

20. A method as in claim 18 wherein said first density level is selected from a group comprised of red, green and blue.

21. A method as in claim 18 wherein said first density level is selected from a group comprised of cyan, magenta and yellow.

22. In a printing apparatus that uses an image forming assembly comprising a plurality of exposure elements, wherein an amount of exposure energy is capable of being varied at each one of said plurality of exposure elements in order to provide a corresponding output colorant density, the therein improvement comprising:

an image data manager that accepts a plurality of image data values from an image data source and is capable of:
  (a) computing, from a plurality of scanned density data values corresponding to each one of said plurality of exposure elements, a non-uniformity correction value for each one of said plurality of exposure elements and for each one of a plurality of output colorant density;
  (b) conditioning, corresponding to each one of said plurality of exposure elements and to each one of said plurality of output colorant densities, each of said plurality of image data values from said image data source using said non-uniformity correction value to generate a conditioned image density data value; and
  (c) providing said conditioned image density data value to the image forming assembly.

23. In a printing apparatus that uses an image forming assembly comprising a plurality of exposure elements, wherein an amount of exposure energy is capable of being varied at each one of said plurality of exposure elements in order to provide a corresponding output colorant density, a method for non-uniformity correction, the method comprising:

providing an image data manager that accepts a plurality of image data values from an image data source and performs the steps of:
  (a) computing, from a plurality of scanned density data values corresponding to each one of said plurality of exposure elements, a non-uniformity correction value for each one of said plurality of exposure elements and for each one of a plurality of output colorant densities;
  (b) conditioning, corresponding to each one of said plurality of exposure elements and to each one of said plurality of output colorant densities, each of said plurality of image data values from said image data source using said non-uniformity correction value to generate a conditioned image density data value; and
  (c) providing said conditioned image density data value to the image forming assembly.

24. A method as in claim 18 comprising the additional steps of:
  (i) conditioning, corresponding to each one of said exposure elements, each of a plurality of image data values from an image data source using said non-uniformity correction value to generate a conditioned image data value; and
  (j) providing said conditioned image data value to an image forming assembly.

25. A method as in claim 24 wherein an interpolated non-uniformity correction value is obtained from non-uniformity correction values corresponding to two closest density levels when an output density level is not among said plurality of density levels.

26. In a printing apparatus that uses an image forming assembly comprising a plurality of exposure elements, wherein an amount of exposure energy is capable of being varied at each one of said plurality of exposure elements in order to provide a corresponding output colorant density, the improvement comprising:

(a) an output test print formed by the image forming assembly, said test print having a predetermined set of output colorant density levels;
  (b) a scanner capable of scanning said output test print and providing a plurality of scanned density data values corresponding to each one of said plurality of exposure elements;
  (c) an image data manager that accepts a plurality of image data values from an image data source and, within each one of said predetermined set of output colorant density levels, is capable of:
    (1) computing, from said plurality of scanned density data values, an exposure element average density value for each of said plurality of exposure elements, to generate a set of exposure element average density values for said plurality of exposure elements;
    (2) computing, from said set of exposure element average density values for said plurality of exposure elements, a density level average density value;
    (3) computing, for each one of said plurality of exposure elements, a non-uniformity correction value based on a difference between said exposure element average density value and said density level average density value;

said image data manager further capable of conditioning, corresponding to each one of said plurality of exposure elements, each of said plurality of image data values from said image data source using said non-uniformity correction value to generate a conditioned image density data value and capable of providing said conditioned image density data value to the image forming assembly; and wherein an interpolated non-uniformity correction value is obtained from non-uniformity correction values corresponding to two closest output colorant density levels when an output colorant density level is not in said predetermined set.

27. In a printing apparatus that uses an image forming assembly comprising a plurality of exposure elements, wherein an amount of exposure energy is capable of being varied at each one of said plurality of exposure elements in order to provide a corresponding output colorant density, a method for non-uniformity correction, the method comprising:

(a) generating an output test print formed by the image forming assembly, said test print having a predetermined set of output colorant density levels;
  (b) scanning said output test print and providing a plurality of scanned density data values corresponding to each one of said plurality of exposure elements;
  (c) providing an image data manager that accepts a plurality of image data values from an image data source and, within each one of said predetermined set of output colorant density levels, performs the steps of:
(1) computing, from said plurality of scanned density data values, an exposure element average density value for each of said plurality of exposure elements, to generate a set of exposure element average density values for said plurality of exposure elements;
(2) computing, from said set of exposure element average density values for said plurality of exposure elements, a density level average density value;
(3) computing, for each one of said plurality of exposure elements, a non-uniformity correction value based on the difference between said exposure element average density value and said density level average density value;

(d) conditioning, corresponding to each one of said plurality of exposure elements, each of said plurality of image data values from said image data source using said non-uniformity correction value to generate a conditioned image density data value;

(e) providing said conditioned image density data value to the image forming assembly; and wherein an interpolated non-uniformity correction value is obtained from non-uniformity correction values corresponding to two closest output colorant density levels when an output colorant density level is not in said predetermined set.

* * * * *